Patented Apr. 8, 1952

2,591,782

UNITED STATES PATENT OFFICE 2,591,782

METHOD OF PREPARING THIOPHOSPHORYL CHLORIDE

Elmer W. Cook, Dolphin Square, England, assignor to American Cyanamid Company, New York, N. Y., a corporation of Maine No Drawing. Application January 26, 1950, Serial No. 140,770

3 Claims. (Cl. 23—14)

1

The present invention relates to an improved method of preparing thiophosphoryl chloride from sulfur and phosphorus trichloride.

According to Woodstock and Adler, J. Am. Chem. Soc. 54, 464 (1932), phosphorus trichloride and sulfur do not react at atmospheric pressure and at the boiling point of the solution. Small amounts of alkali metal sulfides or alkaline earth metal sulfides catalyze the reaction in a closed vessel at temperatures of from 150° to 160° C.

I have now discovered that thiophosphoryl chloride may be readily prepared by reacting phosphorus trichloride with sulfur in the presence of an aluminum halide chosen from the group consisting of aluminum bromide and aluminum chloride.

The reaction takes place at temperatures ranging from room temperature (20–25° C.) to the boiling point of phosphorus trichloride (76° C.), and hence avoids the use of pressure and higher temperatures employed in former methods.

The amount of aluminum halide needed to catalyze the reaction is usually within the range of from 2% to 5% of the weight of the reactants. Quantities of catalyst above this range produce a very rapid reaction which may be found difficult to control.

In carrying out the present process, the phosphorus trichloride, sulfur and aluminum halide are placed in a suitable container provided with a reflux condenser. The reaction is exothermic, and it often becomes necessary to cool the reaction vessel. After the reaction is completed, the thiophosphoryl chloride is obtained by distilling the crude product.

The following examples will further illustrate the invention.

Example 1

To a mixture of 100 g. (0.728 mol) of phosphorus trichloride and 24 g. (0.748 mol) of sulfur heated to 45° C., 3.0 g. (0.112 mol) of anhydrous aluminum bromide were added. A vigorous reaction immediately took place (controlled by an ice-bath), and the temperature rose immediately to 120° C. with the formation of an orange-yellow liquid. After stirring for five minutes at 110° to 120° C., the crude product was distilled. 102 g. (82.5% yield) of thiophosphoryl chloride, a colorless liquid boiling at 125° to 126° C., were obtained.

Example 2

To a mixture of 100 g. of phosphorus trichloride and 24 g. of sulfur at room temperature (25° C.), 6.0 g. of anhydrous aluminum bromide were added. The temperature rose rapidly to 115° C., and yellow-sulfur slurry changed simultaneously to a clear orange-yellow liquid. The product, which distilled directly from the reaction flask, was a colorless liquid boiling at 126° C. and weighing 101.1 g. (81.7% yield).

Example 3

To a mixture of 100 g. of phosphorus trichloride and 24 g. of sulfur heated to reflux temperature (76° C.), 2.4 g. of anhydrous aluminum chloride were added. After refluxing three to four minutes a vigorous boiling of the mixture took place, and simultaneously the yellow sulfur suspension changed to a clear orange-yellow liquid. The solution was cooled to room temperature, washed with 350 cc. of ice water, dried over anhydrous calcium chloride, filtered, and distilled. 90.2 g. (72.9% yield) of thiophosphoryl chloride were obtained.

The present invention provides a simple and convenient method of preparing thiophosphoryl chloride. The reaction takes place without the use of pressure, the reaction period is brief and the product is easily recovered from the reaction mixture.

While the invention has been described with particular reference to specific embodiments, it is to be understood that it is not to be limited thereto but is to be construed broadly and restricted solely by the scope of the appended claims.

I claim:

1. A method of preparing thiophosphoryl chloride which comprises reacting phosphorus trichloride with sulfur in the presence of an aluminum halide catalyst chosen from the group consisting of aluminum bromide and aluminum chloride, and recovering the thiophosphoryl chloride.

2. The method of claim 1 in which the reaction temperature is within the range of from 20° C. to 76° C.

3. The method of claim 1 in which the catalyst is from 2% to 5% of the weight of the reactants.

ELMER W. COOK.

REFERENCES CITED

Knotz, Chemical Abstracts, American Chemical Society, vol. 43, No. 22, Nov. 25, 1949, page 9344h.